(12) United States Patent
Wegener

(10) Patent No.: US 6,979,016 B1
(45) Date of Patent: Dec. 27, 2005

(54) COMBINED FRONT BUMPER REPLACEMENT AND RECEIVER HITCH ASSEMBLY FOR A VEHICLE

(75) Inventor: Darrin Wegener, Shiner, TX (US)

(73) Assignee: Ranch Hand, Ltd., Shiner, TX (US)

( * ) Notice: Subject to any disclaimer, the term of this patent is extended or adjusted under 35 U.S.C. 154(b) by 45 days.

(21) Appl. No.: 10/867,360

(22) Filed: Jun. 14, 2004

(51) Int. Cl.$^7$ .......................... B60R 19/03; B60R 19/48
(52) U.S. Cl. ..................... 280/505; 280/500; 280/495; 293/115; 293/120
(58) Field of Search ................................ 280/505, 500, 280/495; 293/115, 108, 117, 121, 142; 296/187.09, 296/193.09, 203.02

(56) References Cited

U.S. PATENT DOCUMENTS

| | | | |
|---|---|---|---|
| 2,747,892 A | 5/1956 | Jones | |
| 2,880,016 A * | 3/1959 | Peterson | 280/491.3 |
| 4,192,524 A | 3/1980 | Twiestmeyer | |
| 4,398,743 A | 8/1983 | Belsky | |
| 4,722,651 A | 2/1988 | Antal | |
| 4,906,015 A | 3/1990 | LaCroix et al. | |
| 5,094,469 A * | 3/1992 | Yamamoto et al. | 280/500 |
| 5,489,111 A | 2/1996 | Collins | |
| 6,139,044 A | 10/2000 | Smith et al. | |
| 6,290,271 B1 * | 9/2001 | Geisler | 293/115 |
| 6,315,338 B1 * | 11/2001 | Schneider et al. | 293/115 |
| 6,318,773 B2 * | 11/2001 | Storer | 293/115 |
| 6,581,955 B2 | 6/2003 | Aquinto | |
| 6,709,036 B1 * | 3/2004 | Evans | 293/120 |
| 6,729,638 B2 * | 5/2004 | McCoy et al. | 280/495 |

* cited by examiner

*Primary Examiner*—Tony Winner
(74) *Attorney, Agent, or Firm*—Jackson Walker, LLP

(57) ABSTRACT

A combination replacement front bumper assembly and receiver hitch assembly for mounting to the front of a vehicle such as a truck. The receiver hitch assembly includes a hitch receiver tube, the frame, and brackets. The brackets are designed to mount to the replacement front bumper at points removed from where the replacement front bumper bolts onto the stock vehicle front bumper bolt holes and to locate the receiving tube behind the cutout in the front bumper of the front bumper replacement assembly.

11 Claims, 3 Drawing Sheets

COMBINED FRONT BUMPER REPLACEMENT AND RECEIVER HITCH ASSEMBLY FOR A VEHICLE

FIELD OF THE INVENTION

The present invention relates generally to replacement front bumpers and receiver hitches for use with vehicles such as trucks, and in particular to a combination replacement bumper assembly and receiver hitch assembly.

BACKGROUND OF THE INVENTION

The field of providing accessories for automobiles, especially trucks, is large and varied. Truck owners are often desirous of adding accessories to their truck for various specialized activities. One such accessory that is commonly employed is known as a front bumper replacement assembly and typically includes a beefed up front bumper and a large grill guard. A front bumper replacement assembly tends to be larger, heavier and more durable than the standard front bumper of a truck and includes the grill guard which will help protect the grill and/or headlights of the truck. Front bumper assemblies will especially help protect the front of a truck when the truck is being used in an off-road environment.

Another accessory often used with an automobile, especially a truck, is a receiver hitch assembly. A receiver hitch assembly includes a receiver hitch member that is typically 2-inch rectangular stock tubing that is dimensioned to receive a hitch. The hitch may be for a trailer, winch, or cargo platform, or other accessory. A receiver hitch assembly allows the truck owner to insert a male hitch member to the front end of the vehicle.

Currently available in the market are replacement bumpers with built-in receiver hitches. These replacement bumpers with built-in receiver hitches typically include a longitudinal bumper member with a rectangular steel receiving member welded thereto—typically centrally located between the two ends of the bumper. Several of these integral bumper/receiver hitches are offered by Ranch Hand at ranchhand.com. Replacement front bumpers (also known as front-end replacements) typically include a beefed up, durable front bumper and a grill guard. The front bumper replacement assemblies attach to the frame of the truck after removal of the stock front bumper therefrom, and may include built-in (integral) receiver hitches.

A vehicle owner presently has an option of buying a replacement front bumper with or without an integral receiver hitch. If the consumer chooses to buy one without a receiver hitch, and later decides they need a receiver hitch, their option is to modify, as by welding or the like, their present replacement front bumper to add a hitch or to purchase a new one that has an integral receiver hitch.

OBJECTS OF THE INVENTION

It is, therefore, an object of the present invention to provide a front bumper replacement assembly for engagement to the frame of a vehicle and to provide a receiver hitch assembly that would retrofit to the replacement front bumper without the need for removing the assembly from the vehicle or for modifying the replacement front bumper or the vehicle itself for acceptance of the receiver hitch assembly.

It is a further object of the present invention to provide for a receiver hitch assembly that is easily mounted to an existing replacement front bumper assembly and which is hidden from view when not in use.

It is yet another object of the present invention to provide for a replacement bumper which is adapted to receive, after it has been mounted to the frame of a vehicle, a receiver hitch, without the necessity of removing the replacement front bumper assembly from the vehicle.

SUMMARY OF THE INVENTION

These and other objects are provided in a replacement front bumper assembly and a receiver hitch assembly, wherein the receiver hitch assembly includes brackets that will mate with the brackets of the replacement front bumper, typically where they attach to the frame of a vehicle.

These and other objects of the invention are provided for in a receiver hitch assembly, to bolt a front bumper replacement assembly, to place the receiver hitch where the license plate is located on the replacement bumper.

These and other objects are provided in a replacement bumper with brackets for locating a receiver hitch assembly centrally on the front bumper adjacent a cutout dimensioned to receive a receiver hitch there through, which cutout may be placed behind a foldable or pivotable front bumper license plate.

DETAILED DESCRIPTION OF PREFERRED EMBODIMENT

Figure 1:
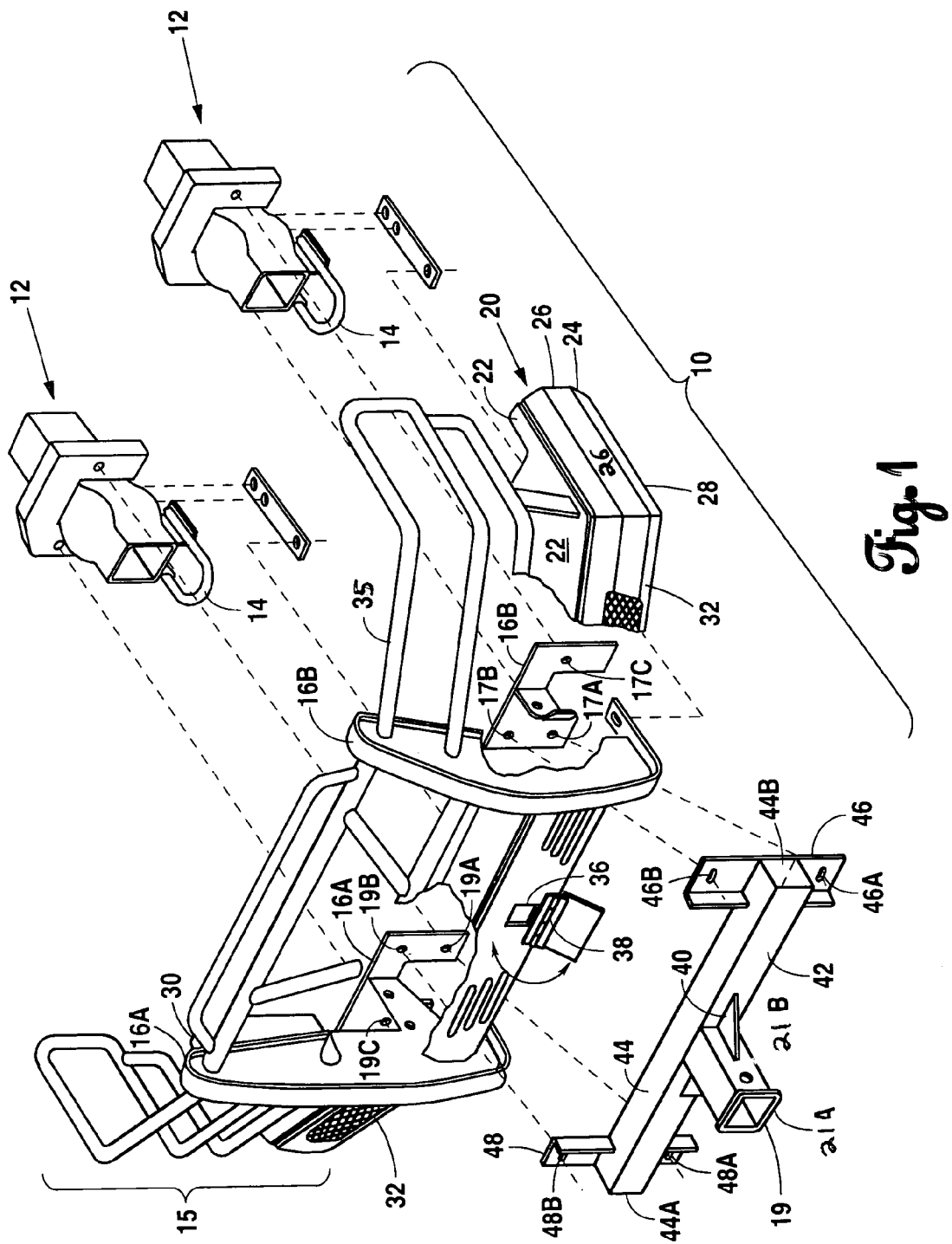
FIG. 1 is a perspective view of Applicants' combined front bumper replacement and receiver hitch assembly including a front bumper replacement assembly and a receiver hitch assembly.
Figure 2:
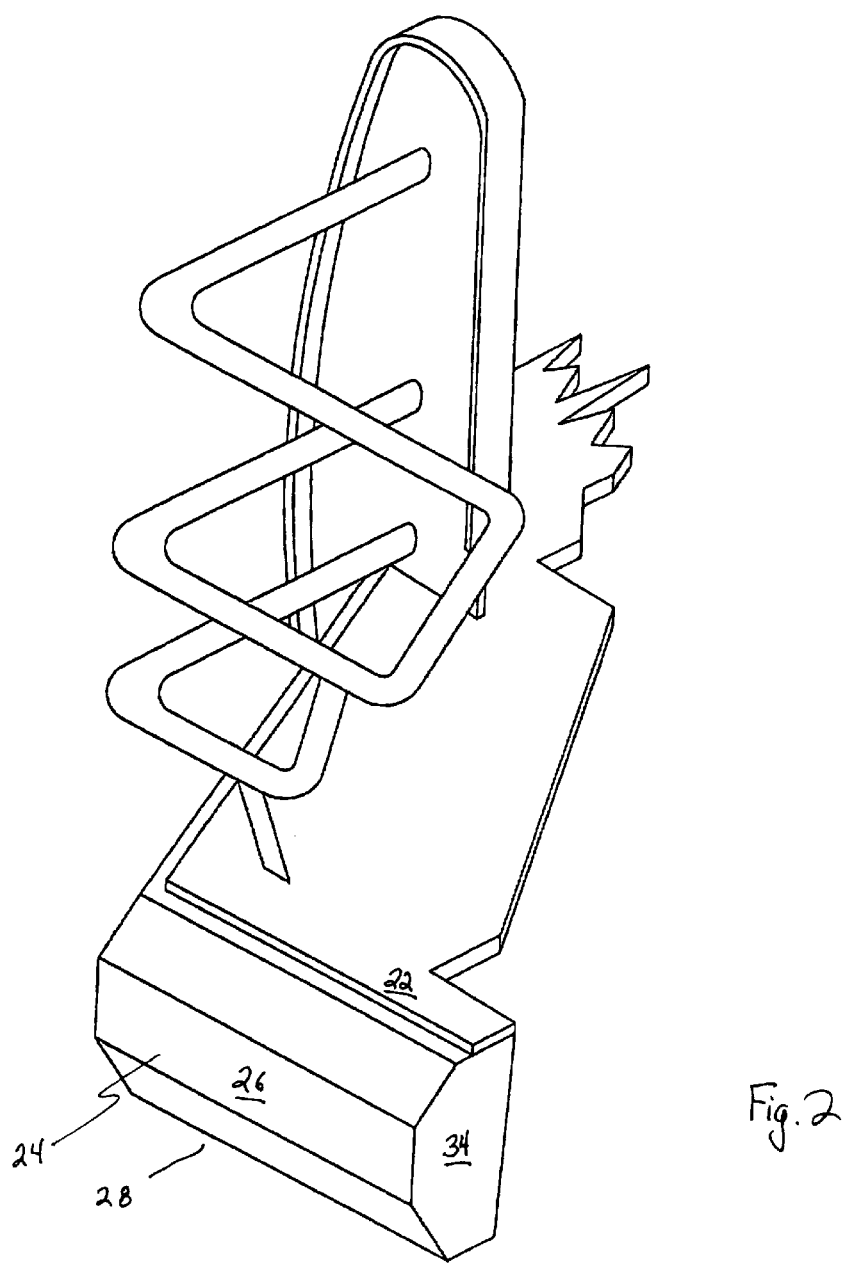
FIG. 2 is a partial cut-away perspective view of one of the side members of the front bumper replacement assembly including end cap (34).
Figure 3:
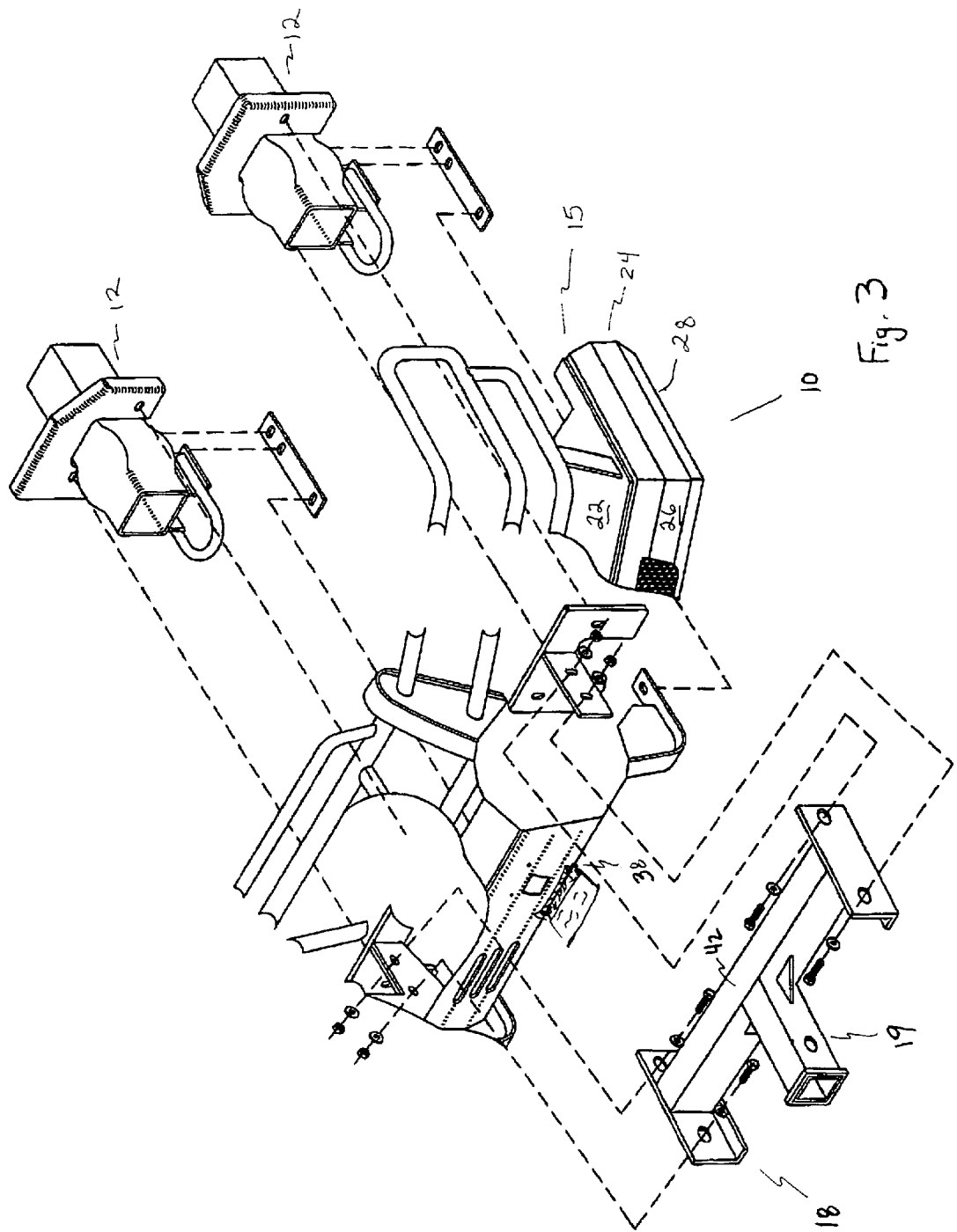
FIG. 3 is an alternate preferred embodiment of Applicants' present invention wherein the receiver assembly (18) is bolted to the front bumper replacement assembly at a point removed from the point where the front bumper replacement assembly attaches to the frame of the vehicle.

FIGS. 1, 2, and 3 illustrate Applicants' combined front bumper replacement and receiver hitch assembly (10), the front bumper replacement assembly (15) and a receiver assembly (18). Frame members (12), such as the pair illustrated in FIG. 1, typically include bolt holes for mounting the stock front bumper thereto. Vehicles, typically trucks, also have tow hooks (14) engaging the front frame members.

Turning now to the details of front bumper replacement assembly (15), it is seen to bolt directly to at least some of the bolt holes or other fastening means that are part of the original configuration for attaching the stock front bumper to the truck. That is, in Applicants' front bumper replacement assembly (15), means, including brackets, are provided that will mate with the original bumper fastening holes of the frame assembly.

Applicants' front bumper replacement assembly (15) includes a front bumper member (20) that has a pair of removed ends and includes a horizontal top wall (22) and a front wall (24). The front wall in turn may be comprised of a horizontal front member (32) which may be straight or have a combined straight portion and angled end portions (as illustrated in FIG. 1). In any case, front member (32) is designed to generally protect that portion of the front end that is typically protected by a stock bumper. Front wall (24) may also include, at the removed ends of the front member thereof, a pair of reward trending side members (28 and 30). The side members are designed to give some protection to the front side portion of the fenders of a vehicle, in much the same way as a "wraparound" front bumper would.

FIG. 2 is referred to provide further details of side members (28/30) (28 illustrated) and also to illustrate the contour or profile of the front wall (24) of bumper member (20). Typically, front bumper members on replacement bumpers have a curved profile when viewed in cross-section, the cross-section taken either at the side members or the front member thereof. Applicants, however, provide, typically, a flat vertical portion (26) on the front wall (24), typically space equal distance between the top wall (22) and bottom wall (23) (see FIG. 2) of the front wall. FIG. 2 is also provided to illustrate that Applicants' novel combined front bumper replacement and receiver hitch assembly (10) may include a front bumper member (20) with side members (28 and 30), which side members (28 and 30) include an end cap (34) for closing off the ends of the side members as by providing a plate that will extend from the top wall to the bottom wall and also include the front wall, as illustrated. This provides strength to front bumper member (20) as well an aesthetically pleasing design, that "closes off" the bumper.

Turning back to FIG. 1, it is seen that Applicants' front bumper replacement assembly (15) may include a grill guard (35), such as is known in the prior art, which typically includes one or more horizontal steel members for providing the grill and/or lights from being struck. The grill guard (35) may engage one or more of uprights (16A/16B). The front wall (24) of front bumper (20) includes a centrally located hitch cutout (36) typically located centrally between the removed ends of the front member (32) and would typically be located on the flat vertical wall portion (26) of the front wall and behind the license plate. A pivotal, spring loaded license plate bracket (38) is provided (such as a spring loaded piano hinge) which, with a license plate attached thereto, may fold away from the hitch cutout (36) which it would typically cover to provide access for the receiver hitch. The spring loaded license plate holder would bias the license plate to an upright, normal position. One would fold it down to obtain access to the hitch cutout (36). The dimensions of hitch cutout (36) are typically slightly larger than the receiver hitch used with the receiver hitch assembly (18), more specifically, the hitch design for receipt into receiving tube (19) thereof.

Turning back to FIG. 1, it is seen that the receiver hitch assembly (18) is comprised of receiving tube (19) for receipt of a hitch there into, such as a ball mount hitch. The receiver assembly hitch (18) is comprised of three parts, the receiving tube (19), a frame (42) having at least one transverse member (44), and means, such as brackets, for attachment of the frame to the frame of the vehicle, preferably at the points of attachment on the vehicle frame designed to hold the original front bumper assembly of the vehicle (FIG. 1) or for attachment to the front bumper replacement assembly (15) at a point other than the stock bumper location attachment points (FIG. 3).

More specifically, receiver assembly (18) has a receiving tube (19) with a removed end (21A) and a near end (21B). The removed end (21A) includes an opening dimension for receipt of a hitch thereinto and a near end (21B) is typically designed to be attached to frame (42), typically between the removed ends (44A and 44B) of the frame. Attachment be strengthened by corner braces (40). Frame (42) typically includes at least one transverse member (44). The function of frame (42) is to engage brackets (46 and 48) and to locate removed end (21A) of the receiving tube behind and axially aligned with the hitch cutout (36).

Brackets (46 and 48) are seen to include holes, hereto designated (46A and 46B, and 48A and 48B), which holes are designed to engage at least some of the holes of the frame that were designed to engage and mount the original bumper. Moreover, in a preferred embodiment, holes (46A, 46B, 48A and 48B) match at least some of the holes in brackets (16A and 16B) here, holes (17A and 17B and 19A and 19B, respectively).

Thus, Applicants have achieved, modification of the prior art to provide a unique retrofittable receiver hitch assembly. The consumer may mount a replacement front bumper on a vehicle such as a truck and later mount a receiver hitch assembly that is hidden from view. Moreover, while Applicants' frame (42) here discloses only a single transverse member (44), a frame may be configured in any manner so as to connect brackets that attach, for example, to elements of the front bumper replacement assembly (FIG. 3) and more preferably to the front bumper assembly to the vehicle so as to place hitch receiving member behind the front wall of a front bumper member. In a preferred embodiment, Applicants' receiver hitch assembly brackets will attach the receiver tube just behind or flush with the cutout in the front bumper, and in another embodiment the receiver tube may project through the cutout.

In FIG. 1, it is seen how the replacement front bumper assembly may be attached to the stock attachment points of the frame using brackets (16A) and (16B) and attaching fasteners to holes 17A, 17C, 19A, and 19C, respectively. If the consumer later chooses to purchase a receiver hitch assembly, he may then remove a pair of bolts (the ones to holes 17A and 19A) to attach the receiver hitch assembly while leaving the bolts that hold the replacement front bumper assembly to the vehicle at 17C and 19C. Thus, the front bumper replacement assembly typically stays securely fixed to the vehicle at two points while the receiver hitch assembly is matched up with a pair of holes on each side, one of which may receive a fastener that will re-engage the front bumper replacement assembly and now the receiver hitch assembly to the frame of the vehicle to one of the original stock bumper replacement holes. Note that the receiver hitch assembly may optionally attach to the front bumper replacement assembly bracket holes at all of the points where the replacement front bumper attaches to the stock fastener holes, at some or at none (see FIG. 3). It is one of Applicants' features for securement of the receiver hitch assembly to the front bumper replacement. It is yet another feature that the receiver hitch assembly will bolt to the front bumper replacement so as to place the removed end of the receiving tube behind or at a cutout in the front bumper.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A receiver hitch in combination with a vehicle engaging replacement front bumper having brackets for mounting the replacement front bumper to the vehicle, the receiver hitch comprising:
   a hitch bracket for at least partial engagement with the brackets of the replacement front bumper;
   a hitch receiving member; and
   a frame for engaging a hitch receiving member to the hitch bracket.

2. The combination of claim 1, wherein the replacement front bumper has a longitudinal member with removed ends and a hole centrally located between the removed ends thereof; and wherein the frame is dimensioned to locate the hitch receiving member at the hole in the longitudinal member of the replacement bumper.

3. The combination of claim 1, wherein the frame is adapted to engage the replacement bumper of the vehicle by fasteners without removal of the replacement bumper from the vehicle.

4. The combination of claim 1, wherein the frame includes a member transverse to the hitch receiving member.

5. The combination of claim 1 wherein the bracket is located at removed end of the transverse member.

6. A front end assembly for a vehicle having a multiplicity of stock front bumper mounting holes, the front end assembly including:
   a front bumper replacement assembly having brackets for engagement with at least some of the stock front bumper mounting holes of the vehicle; and
   a receiver hitch assembly including a receiving tube, the receiver hitch assembly adapted to engage the front bumper replacement assembly without the need to remove the front bumper replacement assembly from the vehicle.

7. The front end assembly of claim 6, wherein the front bumper replacement assembly includes a front wall having a cutout therein; and, wherein the receiver hitch assembly includes a frame with brackets adapted to mount the receiver hitch assembly to the front bumper assembly such that the receiving tube is at the cutout of the front wall of the front bumper assembly.

8. The front end assembly of claim 7, wherein the front bumper replacement assembly includes a bracket for supporting a license plate, the bracket adapted to locate the license plate so as to cover up the cutout in the front bumper therein.

9. The front end assembly of claim 8, wherein the bracket for holding the license plate is adapted to pivot the license plate so as to move from a position covering the cutout in the front wall to a position which uncovers the cutout in the front wall of the front bumper replacement assembly.

10. The front end assembly of claim 6 wherein the receiver hitch assembly includes a frame and brackets, the frame for locating the brackets adjacent at least one of the front bumper mounting holes.

11. The front end assembly of claim 6 wherein the receiver hitch assembly includes a frame and brackets, the frame for locating the brackets to points removed from any of the multiplicity of stock front bumper mounting holes.

* * * * *